United States Patent [19]

Avtjoglou

[11] Patent Number: 4,816,650
[45] Date of Patent: Mar. 28, 1989

[54] DISPLAY OF INFORMATION AT SERVICE STATIONS

[76] Inventor: Agis Avtjoglou, 504 Doncaster, Main Road, Claremont, Cape Province, South Africa

[21] Appl. No.: 65,319

[22] Filed: Jun. 22, 1987

[51] Int. Cl.$^4$ .............................................. B67D 5/22
[52] U.S. Cl. .................................. 235/94 R; 235/58 P
[58] Field of Search ............... 235/58 R, 58 M, 58 P, 235/60 P, 61 PK, 61 PD, 61 PG, 94 R, 94 A, 97, 61 M; 377/14, 15, 38

[56] References Cited

U.S. PATENT DOCUMENTS

| | | |
|---|---|---|
| 3,548,165 | 12/1970 | Linnenkamp ........................ 377/15 |
| 3,564,591 | 2/1971 | Riddle et al. ...................... 235/94 R |
| 3,668,375 | 6/1972 | Smilgys et al. .................... 235/94 R |

*Primary Examiner*—B. R. Fuller
*Attorney, Agent, or Firm*—Michael N. Meller

[57] ABSTRACT

A service station installation is disclosed in which the fuel amount and cost registers of the dispensing pump are connected by an information link to a hand-portable unit which displays the same information. The unit can be affixed to the windscreen of the vehicle which is being refueled or can be placed on the vehicle. The driver can monitor fuel amount and cost without leaving his vehicle.

6 Claims, 1 Drawing Sheet

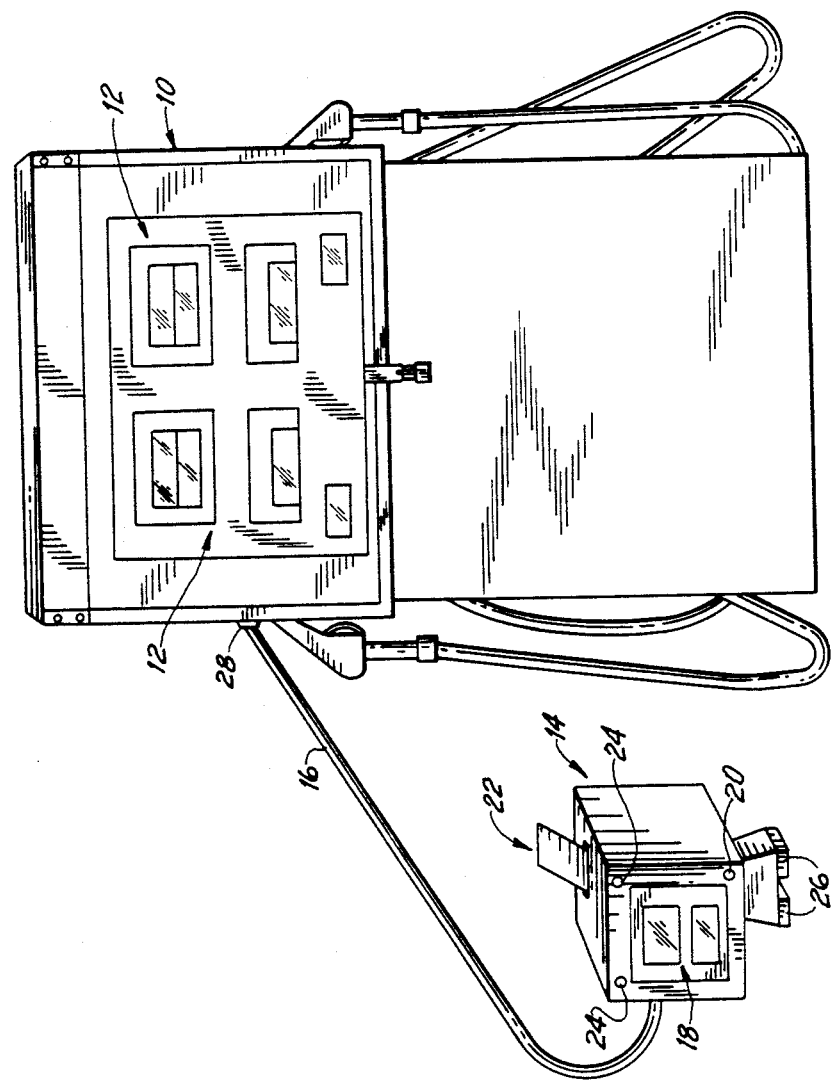

DISPLAY OF INFORMATION AT SERVICE STATIONS

This invention relates to the display of information at service stations where fuel is dispensed to motorists.

According to the invention there is provided, at a service station where fuel is dispensed to motorists, a hand-portable display unit which can removably be placed on, or attached to, a vehicle whose fuel tank is being filled by means of a fuel dispensing pump at the service station, there being an information link between said display unit and the pump, whereby the cost and/or quantity of fuel dispensed is displayed on said display unit while the latter is in position on, or attached to, the vehicle.

The display unit can then, for example, be placed on the bonnet of the vehicle or attached to the outside of the vehicle's windscreen, where the motorist can see the figures displayed without the inconvenience of having to twist around or even having to leave his vehicle to be able to see the fixed display on the pump itself. Where the display unit is intended simply to be placed on the vehicle bonnet, it may be provided with rubber, felt, or other suitable pads at the bottom so as to avoid damage being done to the vehicle paint work. To enable the display unit to be attached in a somewhat more positive manner to the vehicle, particularly when it is intended to be attached to the vehicle windscreen, it may be provided with one or more suitably placed suction cups.

The information link may conveniently be in the form of a flexible wire connection. If desired, the connection may be via a plug-in connector, to facilitate replacement of the display unit, or interchanging thereof with another similar unit.

The display unit may comprise an LED, liquid crystal, or any other suitable form of display. It would be particularly suitable for use with a pump of the type already provided with an electronically driven display as an integral (i.e. fixed) part thereof. The display unit can then simply be connected electrically in parallel with the existing display of the pump.

If desired, the display unit can be provided with advertising material advertising or promoting the goods and/or services of the service station or oil company whose products are sold by the service station.

An embodiment of the invention will now be described, by way of example, with reference to the single FIGURE of the accompanying drawings.

In the drawing reference numeral 10 designates a conventional petrol dispensing pump which includes display 12 showing the amount of fuel dispensed and the cost.

The unit according to the invention is shown at 14 and is connected by a cable 16 to the pump 10. The cable 16 is linked to the left hand display 12 so that the readings on the display 12 are reproduced on the displays 18 of the unit 14.

The unit 14 further includes a printer such as is to be found on a cash register which, on a button 20 being pressed, prints and dispenses a cash slip 22 giving full details of the purchase. The slip can also include advertising.

To enable the unit 14 to be secured to a vehicle windshield, suction cups 24 can be provided. To enable the unit to stand on the body of the vehicle, pads 26 of rubber, felt or other material can be provided. Reference numeral 28 designates a plug-in connctor which enables the unit and the cable 16 to be detached from the pump 10.

I claim:

1. A hand-portable display unit which can removably be mounted on a vehicle whose fuel tank is being filled by means of a fuel dispensing pump at a service station, there being an information link between said display unit and the pump, whereby at least one of the cost and quantity of fuel dispensed is displayed on said display unit while said display unit is in position on the vehicle.

2. A unit as claimed in claim 1, wherein the display unit is provided with rubber, felt, or other suitable pads at a bottom of said display unit so as to avoid damage being done to the vehicle paint work.

3. A unit as claimed in claim 1, and which includes one or more suitably placed suction cups.

4. A unit as claimed in claim 1, wherein the information link is in the form of a flexible wire connection.

5. A unit as claimed in claim 1, and including a printer for producing a sales slip showing the amount of fuel sold and/or the sales value.

6. A service station installation comprising a fuel dispensing pump including means for registering at least one of an amount of fuel dispensed and a cost thereof, a hand-portable display unit which can be removably mounted on a vehicle whose fuel tank is being filled by said pump, and an information link between said display unit and said pump whereby at least one of the cost and quantity of fuel dispensed is displayed to the driver on said display unit while said display unit is in position on the vehicle.

* * * * *